US010563325B2

United States Patent
Wang et al.

(10) Patent No.: US 10,563,325 B2
(45) Date of Patent: *Feb. 18, 2020

(54) METHOD FOR MAKING CARBON FIBER FILM

(71) Applicants: Tsinghua University, Beijing (CN); HON HAN PRECISION INDUSTRY CO., LTD., New Taipei (TW)

(72) Inventors: Jiang-Tao Wang, Beijing (CN); Wei Zhao, Beijing (CN); Peng Liu, Beijing (CN); Yang Wei, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 192 days.

This patent is subject to a terminal disclaimer.

(21) Appl. No.: 15/598,271

(22) Filed: May 17, 2017

(65) Prior Publication Data

US 2017/0335492 A1    Nov. 23, 2017

(30) Foreign Application Priority Data

May 20, 2016 (CN) .......................... 2016 1 0336944

(51) Int. Cl.
*D01F 9/127* (2006.01)
*C01B 32/16* (2017.01)
(Continued)

(52) U.S. Cl.
CPC .......... *D01F 9/1272* (2013.01); *B01J 19/087* (2013.01); *C01B 32/16* (2017.08); *C01B 32/168* (2017.08); *C01B 32/186* (2017.08); *C01B 32/20* (2017.08); *C01B 32/205* (2017.08); *D01F 9/127* (2013.01); *D01F 9/1273* (2013.01); *D01F 9/1275* (2013.01); *D01F 9/1277* (2013.01);
(Continued)

(58) Field of Classification Search
CPC ....................................................... B01J 19/087
See application file for complete search history.

(56) References Cited

U.S. PATENT DOCUMENTS

| | | | |
|---|---|---|---|
| 10,011,488 B2 | 7/2018 | Jiang et al. | |
| 2002/0123230 A1 | 9/2002 | Hubacek | |

(Continued)

FOREIGN PATENT DOCUMENTS

| | | |
|---|---|---|
| CN | 101279372 | 10/2008 |
| CN | 101352669 | 1/2009 |

(Continued)

OTHER PUBLICATIONS

Li, Scientific Reports 3: 2353, (2013) (Year: 2013).*

(Continued)

*Primary Examiner* — Joel G Horning
(74) *Attorney, Agent, or Firm* — ScienBiziP, P.C.

(57) ABSTRACT

A method for making carbon fiber film includes growing a carbon nanotube array on a surface of a growth substrate. A carbon nanotube film is pulled out from the carbon nanotube array, and pass through a reaction room. A negative voltage is applied to the carbon nanotube film. A carrier gas and a carbon source gas are supplied to the reaction room to form graphite sheets on the carbon nanotube film.

18 Claims, 7 Drawing Sheets

(51) Int. Cl.
*C01B 32/168* (2017.01)
*C01B 32/205* (2017.01)
*C01B 32/186* (2017.01)
*C01B 32/20* (2017.01)
*B01J 19/08* (2006.01)
*B82Y 30/00* (2011.01)
*B82Y 40/00* (2011.01)

(52) U.S. Cl.
CPC .......... *B01J 2219/0803* (2013.01); *B01J 2219/0886* (2013.01); *B82Y 30/00* (2013.01); *B82Y 40/00* (2013.01); *C01B 2202/08* (2013.01); *Y10S 977/742* (2013.01); *Y10S 977/847* (2013.01); *Y10S 977/961* (2013.01)

(56) References Cited

U.S. PATENT DOCUMENTS

| | | | |
|---|---|---|---|
| 2007/0059370 A1 | 3/2007 | Chou et al. | |
| 2007/0281086 A1 | 12/2007 | Hsiao | |
| 2012/0205834 A1* | 8/2012 | Lemaire | B82Y 30/00 264/171.26 |
| 2015/0211980 A1 | 7/2015 | Wang et al. | |
| 2016/0023903 A1 | 1/2016 | Jiang et al. | |
| 2016/0023908 A1 | 1/2016 | Jiang et al. | |

FOREIGN PATENT DOCUMENTS

| | | |
|---|---|---|
| CN | 102329527 A | 1/2012 |
| CN | 102936010 | 2/2013 |
| CN | 104692357 | 6/2015 |
| CN | 104808325 | 7/2015 |
| CN | 105439114 | 3/2016 |
| TW | 200711722 | 4/2007 |
| TW | I372188 | 9/2012 |
| TW | I386511 | 2/2013 |
| TW | 201604129 A | 2/2016 |
| TW | 201604130 | 2/2016 |

OTHER PUBLICATIONS

Plasma-induced alignment of carbon nanotubes; Bower et al.; Applied Physics Letters; vol. 77, No. 9; p. 830-832; Aug. 7, 2000.
Spatially Selective Guided Growth of High-Coverage Arrays and Random Networks of Single-Walled Carbon Nanotubes and their Integration into Electronic Devices; Kocabas et al.; J. Am. Chem. Soc. 2006, 128, 4540-4541; Mar. 22, 2006.
Fabrication of Ultralong and Electrically Uniform Single-Walled Carbon Nanotubes on Clean Substrates; Wang et al.; Nano Letters 2009, vol. 9,No. 9; 3137-3141; Aug. 3, 2009.
Ke Chang et al., Imaging of Ferroelectric Domains by Charged Nano particle Decoration Method, Journal of Synthetic Crystals, Oct. 31, 2006, 958-962, vol. 35, No. 5.

* cited by examiner

METHOD FOR MAKING CARBON FIBER FILM

CROSS-REFERENCE TO RELATED APPLICATIONS

This application claims all benefits accruing under 35 U.S.C. § 119 from China Patent Application No. 201610336944.5, filed on May 20, 2016, in the China Intellectual Property Office. This application is related to commonly-assigned application entitled, "DEVICE FOR MAKING CARBON FIBER FILM", concurrently filed Ser. No. 15/598,274; "CARBON FIBER FILM AND METHOD FOR MAKING THE SAME", concurrently filed Ser. No. 15/598,278. Disclosures of the above-identified applications are incorporated herein by reference.

FIELD

The present application relates to a method for making carbon fiber film, and particularly to a method for making a vapor grown carbon fiber film.

BACKGROUND

Vapor grown carbon fibers (VGCFs) have a high specific strength, a specific modulus, and a crystalline orientation. In addition, VGCFs have good electrical conductivity and thermal conductivity. Thus, VGCFs have attracted much attention in recent years.

VGCFs is conventionally prepared by catalytic cracking a hydrocarbon compound and vapor depositing on transition metal, such as iron, cobalt, nickel, or any combination alloy thereof. In detail, a substrate is located in a reaction tube, wherein the substrate is coated a metal granule layer acted catalyst, and then a mixing gas including a hydrocarbon and a hydrogen is supplied into the reaction tube. Finally, VGCFs are grown on the substrate. However, the above-described method for making VGCFs is difficult to continuous and batch production.

What is needed, therefore, is to provide a method for making carbon fiber film that can overcome the above-described shortcomings.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the embodiments described herein.

Several definitions that apply throughout this disclosure will now be presented.

The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 1:
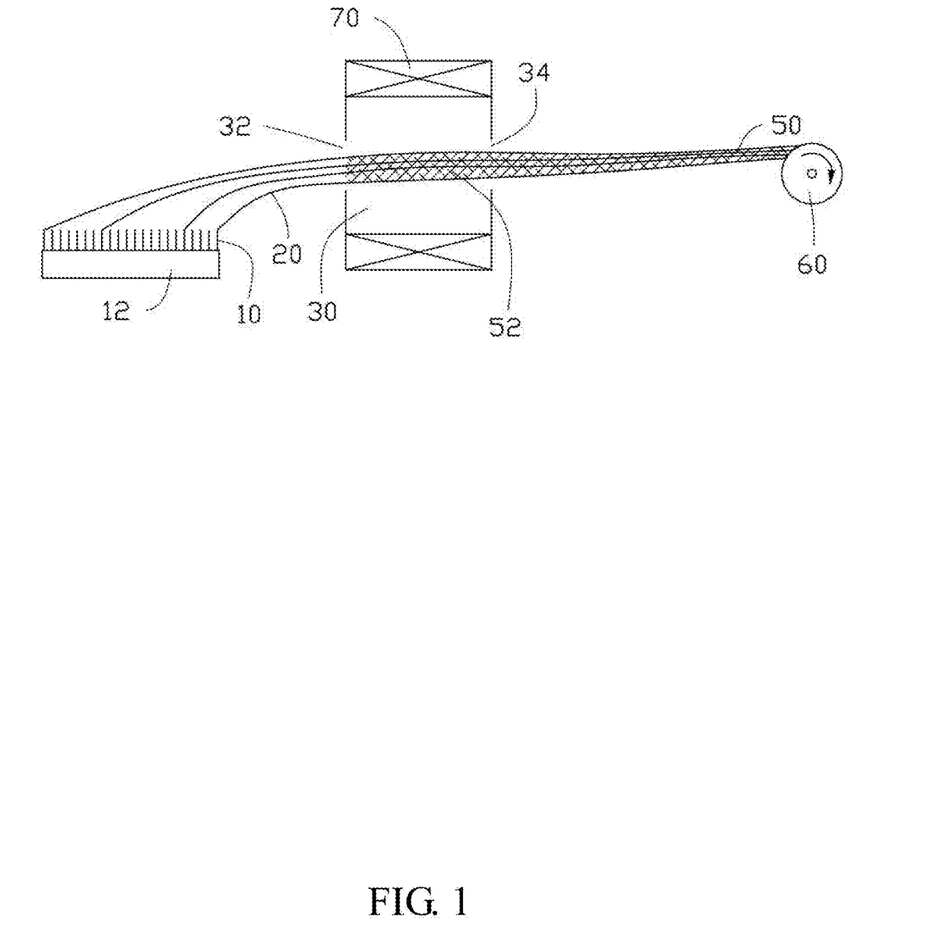
FIG. 1 is a schematic view of one embodiment of a device used for making a carbon fiber film.

Referring to FIG. 1, a method for making a carbon fiber film 50 of one embodiment includes the following steps:

(S11), growing a carbon nanotube array 10 on a surface of a growth substrate 12;

(S12), applying a negative voltage to the carbon nanotube array 10;

(S13), pulling out a carbon nanotube film 20 from the carbon nanotube array 10 during the process of applying the negative voltage to the carbon nanotube array 10, and making the carbon nanotube film 20 pass through a reaction room 30; and (S14), supplying a carrier gas and a carbon source gas to the reaction room 30 and forming the carbon fiber film 50 by controlling a temperature of the reaction room 30.

In step (S11), the carbon nanotube array 10 can be a super-aligned array formed by a chemical vapor deposition method. The chemical vapor deposition method for making the carbon nanotube array generally includes the following steps:

(S111), providing the growth substrate 12, wherein the growth substrate 12 can be a substantially flat and smooth silicon substrate with a diameter of 4 inches, and the silicon substrate can be a P-type silicon wafer, an N-type silicon wafer or a silicon wafer formed with an oxidized layer thereon. In one embodiment, a 4-inch, P-type silicon wafer is used as the growth substrate 12.

(S112), forming a catalyst layer on the growth substrate 12, wherein the catalyst layer is made of a material selected from the group consisting of iron (Fe), cobalt (Co), nickel (Ni), and an alloy thereof. In one embodiment, the catalyst layer is Fe;

(S113), annealing the growth substrate 12 with the catalyst layer in air at a temperature in a range from 700° C. to 900° C. for about 30 minutes to about 90 minutes; and (S114), providing the carbon source gas at high temperature to a furnace for about 5 minutes to about 30 minutes to grow the carbon nanotube array 10 on the growth substrate 12, wherein the growth substrate 12 has been put in the furnace which has been heated to a temperature of 500° C.-740° C. and is filled with a protective gas. The carbon source gas can be, e.g., methane, ethylene, propylene, acetylene, methanol, ethanol, or a mixture thereof. The protective gas can, preferably, be made up of at least one of nitrogen ($N_2$), ammonia ($NH_3$), and a noble gas in the present embodiment.

Moreover, the carbon nanotube array 10 formed under the above conditions is essentially free of impurities such as carbonaceous or residual catalyst particles. The carbon nanotube array 10 includes a plurality of carbon nanotubes parallel to each other and perpendicular to a top surface of the growth substrate 12.

In the step (S12), the negative voltage can be in a range from about −6000 volts (V) to about −600 V. In one embodiment, the negative voltage is in a range from about −3000 V to about −600 V. The method for applying the negative voltage to the carbon nanotube array 10 can be selected according to need. The present application discloses two embodiments of methods for applying the negative voltage to the carbon nanotube array 10.

One Embodiment of Method

The growth substrate 12 is a silicon wafer formed with an oxidized layer thereon, and the silicon wafer formed with an oxidized layer thereon is electric insulation. A power source has a first terminal and a second terminal. The first terminal of the power source is electrically connected to one or more carbon nanotubes of the carbon nanotube array 10, and the second terminal of the power source is grounded or electrically connected to a metal shell surrounding the furnace. Thus, the negative voltage is applied to the carbon nanotube array 10. The metal shell supports, protects and shields the reaction room 30, and shields the outside interference. The material of the metal shell may be nickel, a resistive alloy or the like.

Another Embodiment of Method

The material of the growth substrate 12 is silicon, and the pure silicon has carriers and leakage current at room temperature and can be used as a conductor. When the silicon is a doped silicon, the doped silicon is also a conductor. The first terminal of the power source is electrically connected to the growth substrate 12, and the second terminal of the power source is grounded or electrically connected to the metal shell surrounding the furnace. Thus, the negative voltage is applied to the growth substrate 12. Because the carbon nanotube array 10 is between the growth substrate 12 and the ground (or metal shell), the negative voltage is also applied to the carbon nanotube array 10.

In step (S13), the negative voltage is continually applied to the carbon nanotube array 10 and simultaneously the carbon nanotube film 20 is pulled out from the carbon nanotube array 10. The carbon nanotube film 20 is obtained by extracting a portion of the carbon nanotube array 10 by the substeps of:

(S131), selecting some carbon nanotube segments of the carbon nanotube array 10 having a determined width, and then using a drawing tool with the predetermined width to secure the end of the carbon nanotube segments of the carbon nanotube array 10; and (S132), pulling the drawing tool away from the carbon nanotube at an even/uniform speed to make the carbon nanotube segments of the carbon nanotube array 10 separate from the carbon nanotube array 10.

In step (S132), the pulling direction can be substantially perpendicular to the growing direction of the carbon nanotube array 10. The drawing tool can be a nipper, a clamp, an adhesive tape, and so on.

In step (S132), during the extracting process, when the end of the carbon nanotube segments of the carbon nanotubes of the carbon nanotube array 10 is drawn out, other carbon nanotube segments are also drawn out in a manner that ends of a carbon nanotube is connected with ends of adjacent carbon nanotubes, by the help of the van der Waals attractive force between the ends of carbon nanotube segments. This characteristic of the carbon nanotubes ensures that a continuous carbon nanotube film 20 can be formed.

A width of the carbon nanotube film 20 is related to a size of the carbon nanotube array 10. A length of the carbon nanotube film 20 can be selected according to need. In one embodiment, when the carbon nanotube array 10 is 4-inch, the width of the carbon nanotube film 20 is in a range from about 0.5 nanometers to about 10 centimeters, and a thickness of the carbon nanotube film 20 is in a range from about 0.5 nanometers to about 10 microns.

Figure 2:
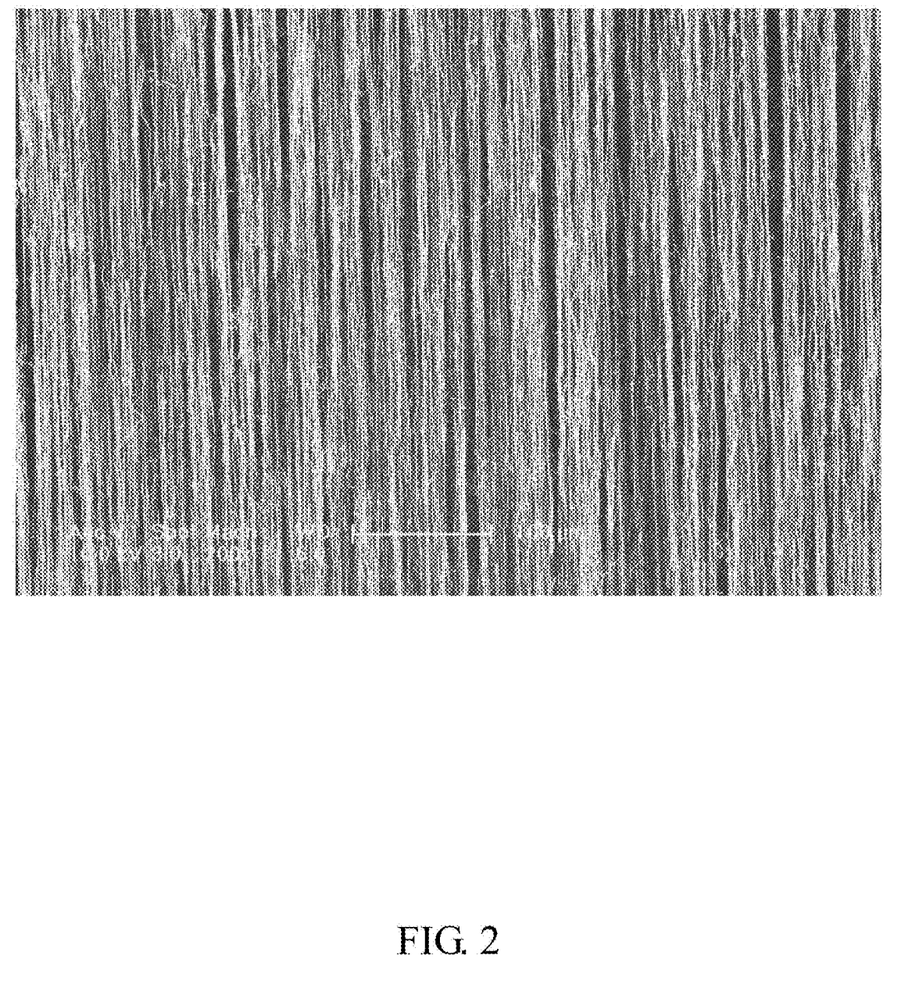
FIG. 2 is a scanning electron microscope (SEM) image of a carbon nanotube film.

Referring to FIG. 2, the carbon nanotube film 20 includes a plurality of carbon nanotubes uniformly distributed therein. The plurality of carbon nanotubes can be combined by van der Waals attractive force. The carbon nanotube film 20 can be a substantially pure structure of the carbon nanotubes, with few impurities. The plurality of carbon nanotubes may be single-walled, double-walled, multi-walled carbon nanotubes, or their combinations. The carbon nanotubes which are single-walled have a diameter of about 0.5 nanometers (nm) to about 50 nm. The carbon nanotubes which are double-walled have a diameter of about 1.0 nm to about 50 nm. The carbon nanotubes which are multi-walled have a diameter of about 1.5 nm to about 50 nm.

The carbon nanotube film 20 is a free-standing film. The term "free-standing" includes, but not limited to, the carbon nanotube film 20 that does not have to be supported by a substrate. For example, the free-standing carbon nanotube film 20 can sustain the weight of itself when it is hoisted by a portion thereof without any significant damage to its structural integrity. So, if the free-standing carbon nanotube film 20 is placed between two separate supporters, a portion of the free-standing carbon nanotube film 20, not in contact with the two supporters, would be suspended between the two supporters and yet maintain film structural integrity.

Figure 3:
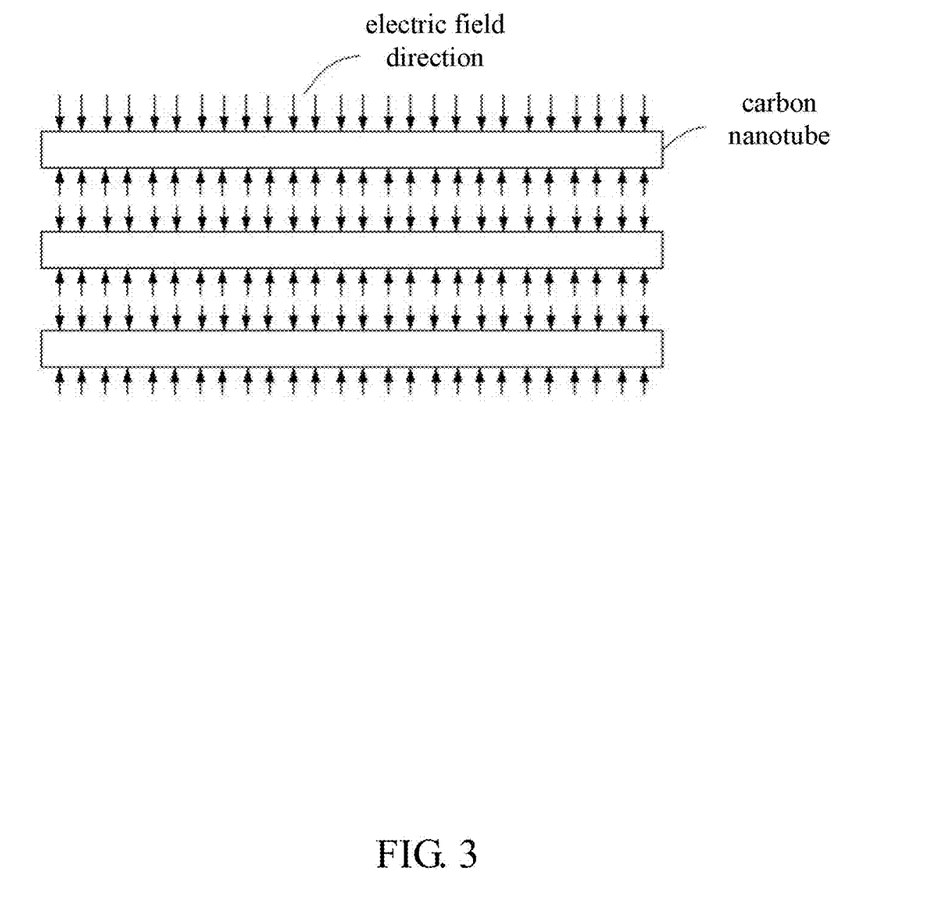
FIG. 3 is a schematic view of electric field direction of the carbon nanotube film of FIG. 2.

The negative voltage is applied to the carbon nanotube array 110. Thus the carbon nanotube array 10 is negatively charged. When the carbon nanotube film 20 is pulled from the carbon nanotube array 10, one end of the carbon nanotube film 20 is still connected to the carbon nanotube array 110, and the carbon nanotube film 20 is also negatively charged. Thus, an electric field is formed on each carbon nanotube of the carbon nanotube film 20. The direction of the electric field points to each carbon nanotube, and is perpendicular to the axial or extending direction of each carbon nanotube, as shown in FIG. 3. The carbon nanotube film 20 has the same negative voltage as the carbon nanotube array 10. The negative voltage is transferred from the carbon nanotube array 10 to the carbon nanotube film 20, and the negative voltage forms the electric field.

The reaction room 30 can define an inlet opening 32 and an outlet opening 34 opposite to the inlet opening 32. The carbon nanotube film 20 is successively pass through entire reaction room 30 by using the drawing tool. The carbon nanotube film 20 is fixed on a supporting shaft 60, as shown in FIG. 1. The carbon nanotube film 20 has a first end and a second end opposite to the first end. The first end is connected to the carbon nanotube array 10, and the second end is connected to the supporting shaft 60. The supporting shaft 60 can rotate about its axis, the carbon nanotube film 20 can be collected on the supporting shaft 60. The supporting shaft 60 is formed of an insulating material. The supporting shaft 60 can also connect to a motor so that the supporting shaft 60 is automatically rotated.

The above steps S12 and S13 can be interchangeable. The carbon nanotube film 20 is first pulled out from the carbon nanotube array 10, then the negative voltage is applied to the carbon nanotube array 10, and the carbon nanotube film 20 is continuously pulled out from the carbon nanotube array 10

Figure 4:
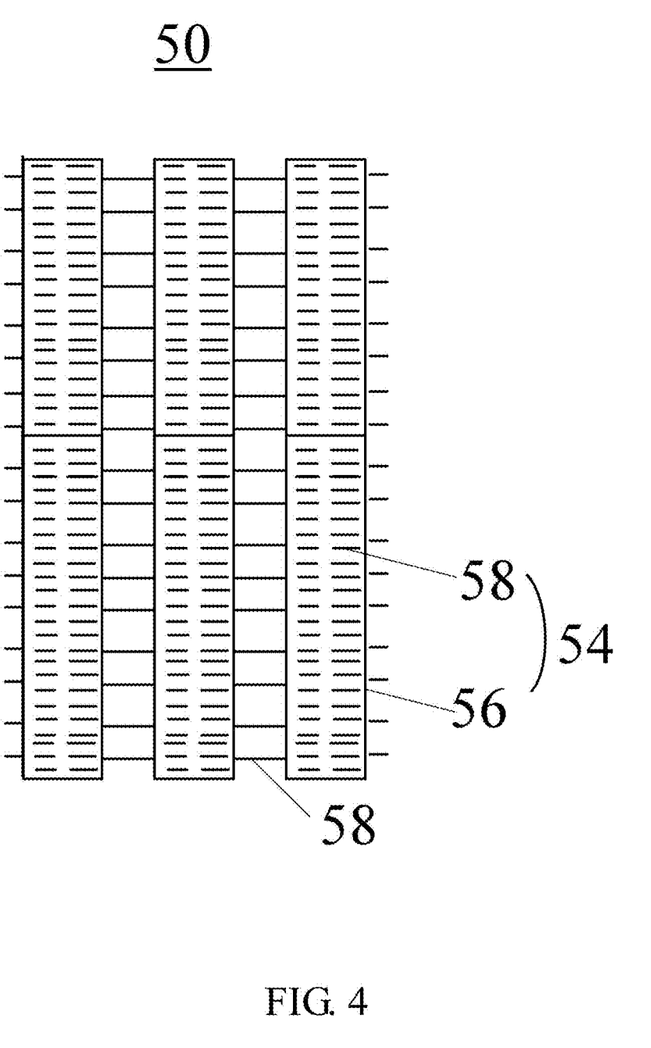
FIG. 4 is a schematic view of a carbon fiber film.

In step (S14), forming the carbon fiber film 50 includes the following steps:

(S141), supplying the carrier gas to the reaction room 30;

(S142), supplying the carbon source gas to the reaction room 30; and (S143), heating the reaction room 30 to a temperature from about 800 degrees Celsius to about 1000 degrees Celsius, cracking the carbon source gas to form many carbon free radicals, graphitizing the carbon free radicals because the carbon nanotube film 20 is negatively charged, to epitaxially form graphite layers 52 as shown in FIG. 4 on each carbon nanotube of the carbon nanotube film 20, wherein the graphite layers 52 and the carbon nanotube film 20 form the carbon fiber film 50.

In step (S141), the reaction room 30 can be purified by the carrier gas. The carrier gas includes nitrogen, ammonia, or inert gas, such as argon. A flow speed of the carrier gas can range from about 50 sccm to about 100 sccm.

In step (S142), the carbon source gas can be a hydrocarbon compound, such as alkyne. A flow speed of the carrier gas can range from about 20 sccm to about 100 sccm.

Figure 5:
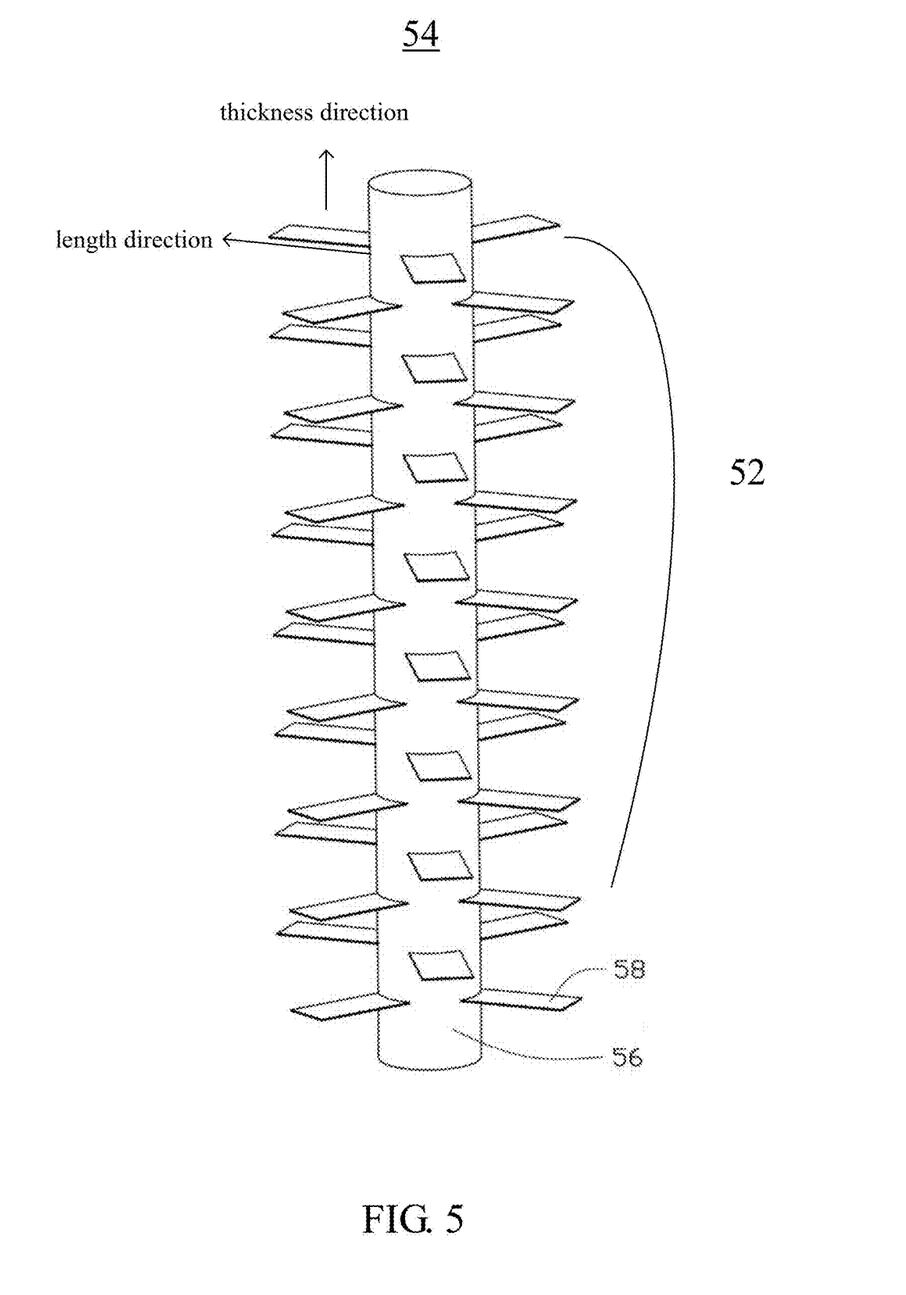
FIG. 5 is a three-dimensional schematic view of one carbon fiber of the carbon fiber film of FIG. 4.
Figure 6:
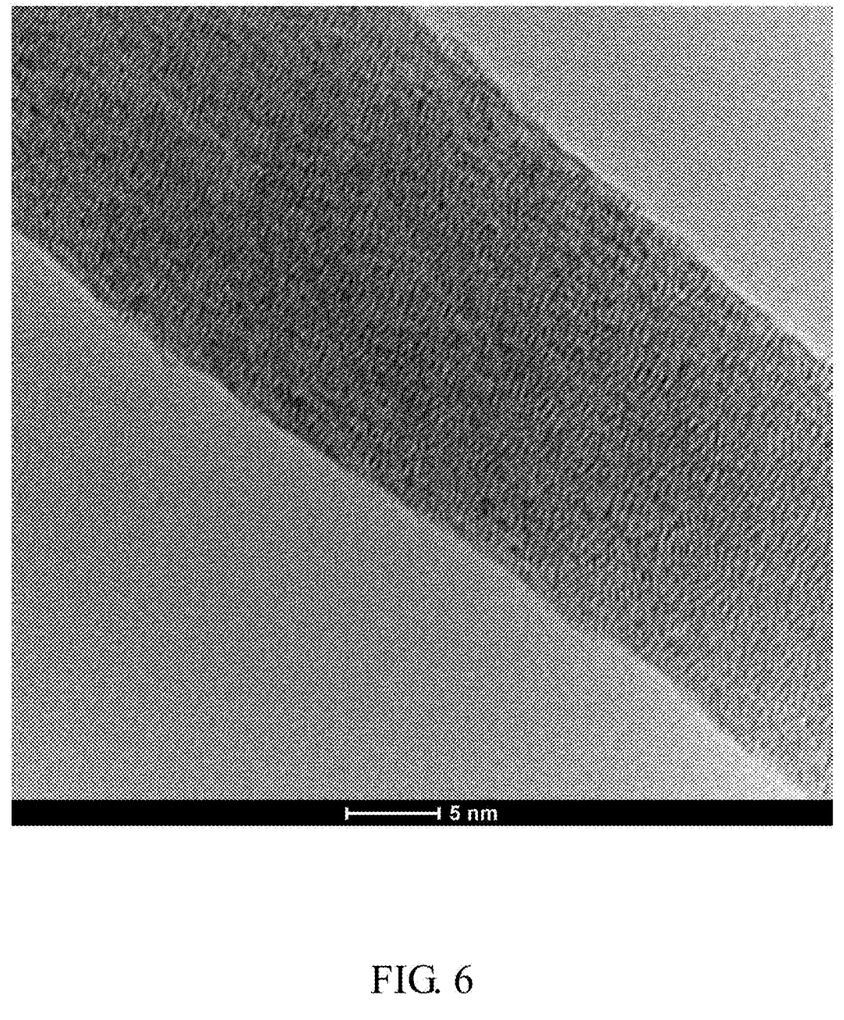
FIG. 6 is a transmission electron microscope (TEM) image of the carbon fiber of FIG. 5.
Figure 7:
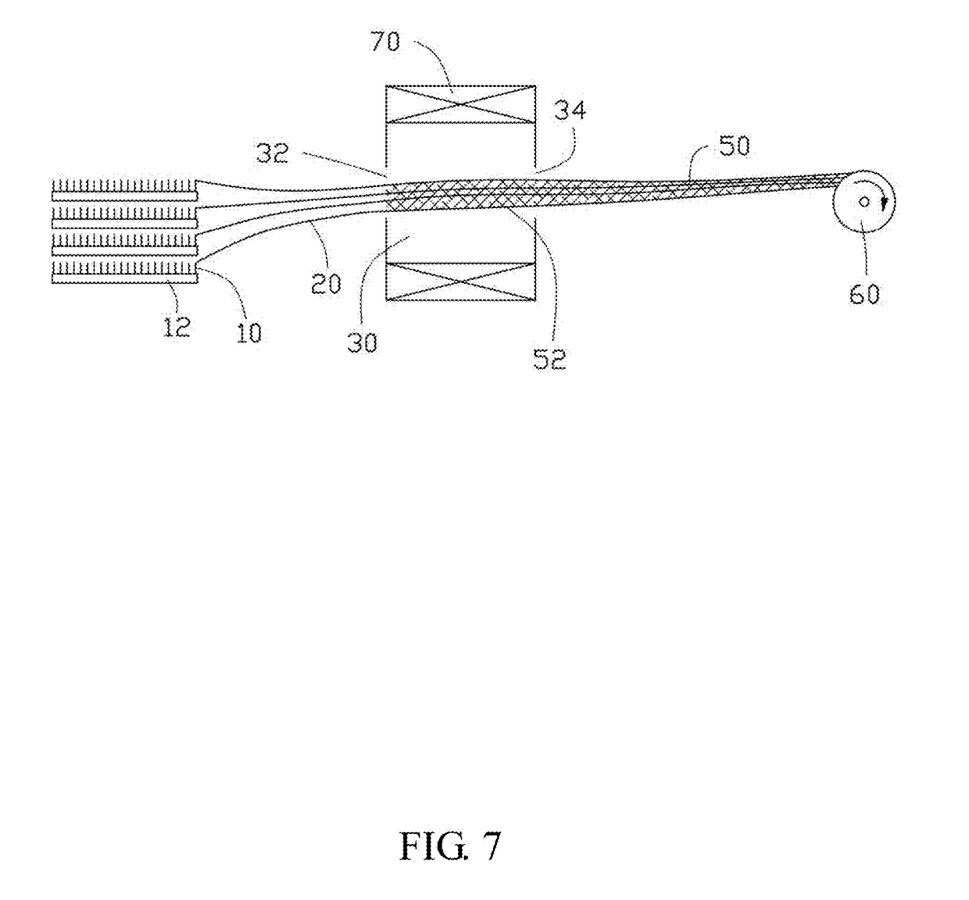
FIG. 7 is a schematic view of another embodiment of a device used for making a carbon fiber film.

In step (S143), a heater 70 surrounds the reaction room 30 and heats the reaction room 30 to the temperature from about 800 degrees Celsius to about 1000 degrees Celsius. The carbon source gas is continuously supplied to the reaction room 30 and is cracked to form carbon free radicals. The carbon free radicals are graphitized to form graphite sheets 58, because the carbon nanotube film 20 is negatively charged. The direction of the electric field vertically points to the axial of each carbon nanotube. The graphite sheets 58 need the lowest energy along the direction of the electric field. The graphite sheets 58 need to be located in the state of lowest energy according to the principle of least action. Thus, the extending direction of each graphite sheet 58 is perpendicular to the axial direction of each carbon nanotube, as shown in FIGS. 4-6.

Many graphite sheets 58 forms a graphite layer 52. The thickness of the graphite layer 52 is related to the time of growing the graphite layer 52. The longer the time of growing the graphite layer 52, the thicker the thickness of the graphite layer 52, and the longer the length of the graphite sheet 58. In one embodiment, when the time of growing the graphite layer 52 ranges from about 30 minters to about 60 minters, a thickness of the graphite layer 52 ranges from about 2 nanometers to about 200 nanometers. In order to uniformly cover the carbon nanotube film 20 and enclose each carbon nanotube, the thickness of the graphite layer 52 is greater than or equal to 2 nanometers. The thickness of a composite structure including the graphite layer 52 and the carbon nanotube film 20 is greater than or equal to 12 nanometers.

In the process of forming the graphite layer 52, the reaction room 30 can be in a state of atmospheric pressure or low pressure. The low pressure in the reaction room 30 can be in a range from about 50 Pa to about 1000 Pa. The carbon nanotube film 20 cannot be destroyed at the temperature of the reaction room 30, because the inert gas is in the reaction room 30 and the pressure in the reaction room 30 ranges from about 50 Pa to about 1000 Pa. In one embodiment, there is atmospheric pressure in the reaction room 30. The pressure is proportional to the negative voltage, the lower the pressure, the smaller the negative voltage. Thus, when there is atmospheric pressure in the reaction room 30, the smaller negative voltage is required during the preparation of the carbon fiber film 50.

The carrier gas and the carbon source gas can be simultaneously supplied to the reaction room 30. At this time, the flow speed of the carrier gas ranges from about 10 sccm to about 50 sccm. In one embodiment, the carrier gas and the carbon source gas are simultaneously supplied to the reaction room 30, the flow speed of the carrier gas is 25 sccm, and the flow speed of the carbon source gas is 50 sccm.

The carbon nanotube film 20 defines a plurality of micropores, which is formed by two adjacent carbon nanotubes of the carbon nanotube film 20. The graphite layers 52 are epitaxially formed on a surface of each carbon nanotube and in the plurality of micropores. The graphite layers 52 thus encloses each carbon nanotubes.

When the supporting shaft 60 is rolled along the direction of pulling the carbon nanotube film 20, the carbon nanotube film 20 continues to be pulled from the carbon nanotube array 10, the graphite layer 52 continues to be formed on a portion of the carbon nanotube film 20 that is in the reaction room 30, and the carbon fiber film 50 continues to be rolled to the supporting shaft 60. Therefore, the carbon fiber film 50 can achieve continuous and batch production.

The supporting shaft 60 can be rotated along a direction substantially perpendicular to the pulling direction of the carbon nanotube film 20, and the carbon fiber film 50 thus is twisted to a string structure, improving the mechanical strength of the carbon fiber film 50.

In the process of applying the negative voltage to the carbon nanotube film 20 and forming the graphite layer 52, the carbon nanotube film 20 is suspended. The first end of the carbon nanotube film 20 is connected to the carbon nanotube array 10, and the second end of the carbon nanotube film 20 is held by the supporting shaft 60. The supporting shaft 60 can be pulled and rotated simultaneously by a motor.

In the method for making the carbon fiber film 50, it is necessary to introduce the carbon source gas and the carrier gas into the reaction room 30 while pulling out the carbon nanotube film 20. In order to ensure the relative seal of the reaction room 30, the present application discloses three embodiment of methods, but these three methods do not limit the present invention.

One Embodiment of Method

The entire process of making the carbon fiber film 50 is carried out in a chamber. The carbon nanotube array 10, the growth substrate 12, the carbon nanotube film 20, the reaction room 30, the carbon fiber film 50, the supporting shaft 60, and the motor for automatically rotating the supporting shaft 60 are placed in the chamber. The chamber has a gas inlet and a gas outlet opposite to the gas inlet. The gas inlet is used for introducing the carbon source gas and the carrier gas into the reaction room 30. The gas outlet is used for removing gas from the reaction room 30. A controller is located outside of the chamber, and the controller is electrically connected to the motor by a perforating electrode.

The perforating electrode can pass through the chamber, does not destroy the pressure in the chamber, and accordingly does not destroy the pressure in the reaction room 30. The controller is used to control the motor.

Another Embodiment of Method

The carbon nanotube array 10, the growth substrate 12, the carbon nanotube film 20, the carbon fiber film 50, the supporting shaft 60, and the motor for automatically rotating the supporting shaft 60 are placed in the reaction room 30. The controller is located outside of the reaction room 30, and the controller is electrically connected to the motor by the perforating electrode. The perforating electrode can pass through the reaction room 30, and does not destroy the pressure in the reaction room 30.

Yet Another Embodiment of Method

The reaction room 30 can be exhausted by a vacuum pump and has a pressure less than 50 Pa. When the carbon nanotube film 20 passes through the reaction room 30, some air enters the reaction room 30. Thus, the pressure in the reaction room 30 can be increased to 50 Pa to 1000 Pa. A vacuum gauge can be installed in the reaction room 30 for measuring the degree of vacuum in the reaction room 30. The pressure in the reaction room 30 is maintained within the range of 50 Pa to 1000 Pa by adjusting the vacuum pump.

Referring to FIGS. 4-6, the carbon fiber film 50 is a membrane structure. The carbon fiber film 50 includes a plurality of carbon nanotubes 56 and a plurality of graphite layers 52. The plurality of carbon nanotubes 56 are joined end to end by van der Waals attractive force and extend along a same direction. Each of the plurality of carbon nanotubes 56 is surrounded by the graphite layer 52. The graphite layer 52 includes a plurality of graphite sheets 58 spaced from each other. Part of the edge of each graphite sheet 58 is joined with the carbon nanotube 56 by a van der waals bond. An angle is defined between each graphite sheet 58 and an outside wall of the carbon nanotube 56, and the angle is about 90 degrees. In one embodiment, the length direction of each graphite sheet 58 is perpendicular to the axial direction of each carbon nanotube 56. An angle is defined between the thickness direction of each graphite sheet 58 and the axial direction of each carbon nanotube 56, the angle is greater than or equal to 0 degrees, and less than or equal to 90 degrees. In one embodiment, the thickness direction of each graphite sheet 58 is parallel to the axial direction of each carbon nanotube 56. The plurality of graphite sheets 58 are interval distribution on the outside wall of each carbon nanotube 56. The length of the plurality of graphite sheets 58 is greater than the diameter of the carbon nanotube 56 and ranges from about 50 nanometers to about 10 microns. The width of the plurality of graphite sheets 58 is similar to the diameter of the carbon nanotube 56 and ranges from about 10 nanometers to about 20 nanometers.

The carbon fiber film 50 includes a plurality of carbon fibers 54 joined end to end. The plurality of carbon fibers 54 extends along a same direction, as shown in FIG. 4. Each carbon fiber 54 includes a carbon nanotube 56 and the plurality of graphite sheets 58. The plurality of graphite sheets 58 forms the graphite layer 52. In each carbon fiber 54, each graphite sheet 58 is joined with the carbon nanotube 56 by the van der waals bond, and the extending direction of each graphite sheet 58 is perpendicular to the axial direction of each carbon nanotube 56. Two adjacent carbon fibers 54 are joined by van der Waals attractive force. In the carbon fiber film 50, two adjacent carbon fibers 54 side by side may be spaced apart from each other. Pores are defined in the carbon fiber film 50 by adjacent carbon fibers 54.

The plurality of carbon nanotubes 56 is uniformly distributed and substantially parallel to a surface of the carbon fiber film 50. The carbon fiber film 50 is a free-standing film and can bend to desired shapes without breaking.

A diameter of each carbon fiber 54 is related to the thickness of the graphite layer 52. The diameter of the plurality of carbon fibers 54 can be in a range from about 450 nanometers to about 100 microns. In one embodiment, the diameter of the plurality of carbon fibers 54 is about 500 nanometers.

At least two carbon nanotube films 20 are first simultaneously pulled out from at least two carbon nanotube arrays 10 and stacked with each other, and then the graphite layer 52 is grown on the at least two stacked carbon nanotube films 20. Thus, the carbon fiber film 50 including at least two stacked carbon nanotube films 20 can be obtained. Adjacent carbon nanotube films 20 can be combined by only the van der Waals attractive force therebetween. Additionally, an angle between the extending directions of the carbon nanotubes in two adjacent carbon nanotube films 20 can be in a range from about 0 degrees to about 45 degrees. The angle between the extending directions of the carbon nanotubes in two adjacent carbon nanotube films 20 is formed by pulling out two carbon nanotube films 20 along different directions. The angle between pulling directions of two carbon nanotube films 20 can be in a range from about 0 degrees to about 45 degrees. In one embodiment, the angle between pulling directions of forming two carbon nanotube films 20 can be in a range from about 0 degrees to about 30 degrees. Stacking the carbon nanotube films 20 will improve the mechanical strength of the carbon fiber film 50. In one embodiment, the carbon fiber film 50 includes two layers of the carbon nanotube films 20, and the angle between the extending directions of the carbon nanotubes in two adjacent carbon nanotube films 20 is about 15 degrees.

The carbon fiber film 50 has good electrical conductivity. A sheet resistance of the carbon fiber film 50 is less than or equal to 100 ohm. Each of the plurality of carbon nanotubes 56 is surrounded by the graphite layer 52, and the graphite sheet 58 is combined with the two adjacent carbon nanotubes 56 by the van der waals bond. Therefore, the mechanical strength of the carbon fiber film 50 is further improved.

Referring to FIG. 6, an embodiment of the method for making the carbon fiber film 50 is shown where a plurality of carbon nanotube films 20 are respectively pulled from a plurality of carbon nanotube arrays 10, the negative voltage is applied to each of the plurality of carbon nanotube films 20, and one graphite layer 52 is formed on each of the plurality of carbon nanotube films 20. Thus, a plurality of carbon fiber films 50 can be simultaneously formed, improving the yield of the carbon fiber film 50. The plurality of carbon fiber films 50 can be respectively collected on multiple supporting shafts 60. The plurality of carbon fiber films 50 can be collected on one supporting shaft 60.

Furthermore, a method for making a carbon fiber film 50 of an embodiment includes the following steps:

(S31), growing the carbon nanotube array 10 on the growth substrate 12;

(S32), pulling out the carbon nanotube film 20 from the carbon nanotube array 10, making the carbon nanotube film 20 passes through the reaction room 30, and fixing the carbon nanotube film 20 on the supporting shaft 60, wherein the supporting shaft 60 is made of conducting material;

(S33), applying the negative voltage to the supporting shaft 60;

(S34), rolling the supporting shaft 60 during the process of applying the negative voltage to the supporting shaft 60, so that continually pulling out the carbon nanotube film 20; and (S35), supplying the carrier gas and the carbon source gas to the reaction room 30 and forming the carbon fiber film 50 by controlling the temperature of the reaction room 30.

In step (S33), the carbon nanotube film 20 is fixed on the supporting shaft 60 and in direct contact with the supporting shaft 60. Thus, when the negative voltage is applied to the supporting shaft 60, the negative voltage is also applied to the carbon nanotube film 20. The method for applying the negative voltage to the supporting shaft 60 can be selected according to need.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may include some indication in reference to certain steps. However, the indication used is only to be viewed for identification purposes and not as a suggestion as to an order for the steps.

What is claimed is:

1. A method for making carbon fiber film, the method comprising:
   providing a carbon nanotube array comprising a plurality of first carbon nanotubes on a surface of a growth substrate;
   pulling out a carbon nanotube film, comprising a plurality of second carbon nanotubes from the carbon nanotube array; and passing the carbon nanotube film through a reaction room;
   applying a negative voltage to the carbon nanotube film; and
   supplying a carrier gas and a carbon source gas to the reaction room and heating the reaction room to be a temperature in a range from about 800 degrees Celsius to about 1000 degrees Celsius.

2. The method of claim 1, wherein the negative voltage is in a range from about −6000 V to about −600 V.

3. The method of claim 1, wherein the applying the negative voltage to the carbon nanotube film is achieved by applying the negative voltage to the carbon nanotube array.

4. The method of claim 3, wherein the growth substrate is a silicon wafer with an oxidized layer thereon, and the applying the negative voltage to the carbon nanotube array is achieved by applying the negative voltage to the plurality of first carbon nanotubes.

5. The method of claim 3, wherein a material of the growth substrate is silicon, and the applying the negative voltage to the carbon nanotube array is achieved by applying the negative voltage to the growth substrate.

6. The method of claim 1, wherein the carbon nanotube film comprises an end, and the end is passed through the reaction room and fixed on a conductive supporting shaft.

7. The method of claim 6, wherein the applying the negative voltage to the carbon nanotube film is achieved by applying the negative voltage to the conductive supporting shaft.

8. The method of claim 1, wherein an electric field is formed on each of the plurality of second carbon nanotubes after applying the negative voltage to the carbon nanotube film.

9. The method of claim 8, wherein an electric field direction of the electric field points to each of the plurality of second carbon nanotubes and is perpendicular to an axial of each of the plurality of second carbon nanotubes.

10. The method of claim 1, wherein the negative voltage is still applied to the carbon nanotube film during supplying the carrier gas and the carbon source gas to the reaction room.

11. The method of claim 10, wherein the carbon source gas is cracked and graphitized to form a plurality of graphite sheets on each of the plurality of second carbon nanotubes.

12. The method of claim 11, wherein an extending direction of each of the plurality of graphite sheets is perpendicular to an axial direction of each of the plurality of second carbon nanotubes.

13. The method of claim 11, wherein the plurality of graphite sheets is joined with the plurality of second carbon nanotubes by a van der waals bond.

14. The method of claim 11, wherein the plurality of graphite sheets is interval distribution on an outside wall of each of the plurality of second carbon nanotubes.

15. The method of claim 1, wherein the carbon nanotube film is suspended during applying the negative voltage to the carbon nanotube film and passing the carbon nanotube film through the reaction room.

16. The method of claim 15, wherein the carbon nanotube film has a first end and a second end opposite to the first end, the first end is connected to the carbon nanotube array, and the second end is held by a supporting shaft.

17. A method for making carbon fiber film, the method comprising:
   providing a plurality of carbon nanotube arrays;
   pulling out a carbon nanotube film from each of the plurality of carbon nanotube arrays to obtain a plurality of carbon nanotube films, and passing the plurality of carbon nanotube films through a reaction room;
   applying a negative voltage to each of the plurality of carbon nanotube films; and
   supplying a carrier gas and a carbon source gas into and heating the reaction room to form a graphite sheet on each of the plurality of carbon nanotube films.

18. A method for making carbon fiber film, the method comprising:
   placing a carbon nanotube film in a reaction room;
   applying a negative voltage to the carbon nanotube film; and
   supplying a carrier gas and a carbon source gas to the reaction room and heating the reaction room to form a plurality of graphite sheets on the carbon nanotube film.

* * * * *